US011859415B2

(12) United States Patent
Savant et al.

(10) Patent No.: US 11,859,415 B2
(45) Date of Patent: Jan. 2, 2024

(54) DOOR HANDLE ASSEMBLY FOR A MOTOR VEHICLE

(71) Applicant: U-Shin Italia S.p.A., Pianezza (IT)

(72) Inventors: Marco Savant, Pianezza (IT); Anthony Guerin, Pianezza (IT)

(73) Assignee: U-SHIN ITALIA S.P.A., Pianezza (IT)

( * ) Notice: Subject to any disclaimer, the term of this patent is extended or adjusted under 35 U.S.C. 154(b) by 494 days.

(21) Appl. No.: 16/874,974

(22) Filed: May 15, 2020

(65) Prior Publication Data

US 2020/0277812 A1 Sep. 3, 2020

Related U.S. Application Data

(63) Continuation of application No. PCT/EP2018/081449, filed on Nov. 15, 2018.

(30) Foreign Application Priority Data

Nov. 16, 2017 (EP) .................................... 17202035

(51) Int. Cl.
*E05B 79/06* (2014.01)
*E05B 79/12* (2014.01)
*E05B 85/16* (2014.01)

(52) U.S. Cl.
CPC .............. *E05B 79/06* (2013.01); *E05B 79/12* (2013.01); *E05B 85/16* (2013.01)

(58) Field of Classification Search
CPC ........... E05B 79/06; E05B 79/12; E05B 85/16
USPC ....................................................... 292/336.3
See application file for complete search history.

(56) References Cited

U.S. PATENT DOCUMENTS

| | | | | |
|---|---|---|---|---|
| 6,234,548 | B1 * | 5/2001 | Mittelbach | E05B 85/16 292/336.3 |
| 9,644,394 | B2 * | 5/2017 | Breimayer | E05B 85/16 |
| 10,914,103 | B2 * | 2/2021 | Cousin | E05B 15/0053 |
| 2012/0139271 | A1 * | 6/2012 | Saitou | E05B 79/06 292/336.3 |
| 2014/0245568 | A1 | 9/2014 | Breimayer et al. | |

FOREIGN PATENT DOCUMENTS

| | | | |
|---|---|---|---|
| DE | 29819472 | 2/1999 | |
| EP | 1267019 | 12/2002 | |
| EP | 3141679 A1 * | 3/2017 | E05B 15/0053 |
| WO | 2017186342 | 11/2017 | |

OTHER PUBLICATIONS

International Search Report for International Application PCT/EP2018/081449, dated Dec. 4, 2018.

* cited by examiner

*Primary Examiner* — Kristina R Fulton
*Assistant Examiner* — Thomas L Neubauer
(74) *Attorney, Agent, or Firm* — Burris Law, PLLC

(57) ABSTRACT

A door handle assembly intended to be mounted on a door of a motor vehicle and its mounting/dismounting method includes a handle linked to a base via a an arm slidably mounted in a housing of the base and including a hook at one of its ends, an actuation device including a first lever engaging the hook, the actuation of the handle causing the sliding of the hook of the arm of the handle and the displacement of the first lever of the actuation device toward the outside of the base along a sliding axis and the actuation of the door opening mechanism to open the door.

10 Claims, 6 Drawing Sheets

DOOR HANDLE ASSEMBLY FOR A MOTOR VEHICLE

CROSS-REFERENCE TO RELATED APPLICATIONS

This application is a continuation of International Application No. PCT/EP2018/081449, filed on Nov. 15, 2018, which claims priority to and the benefit of EP 17202035.6, filed on Nov. 16, 2017. The disclosures of the above applications are incorporated herein by reference.

FIELD

The present disclosure relates to a door handle assembly and a method for mounting/dismounting this door handle assembly on a door of a motor vehicle.

BACKGROUND

The statements in this section merely provide background information related to the present disclosure and may not constitute prior art.

This type of door handle is linked to a base via a hinge at a first end of the handle and via an arm slidably mounted in a housing of the base at a second end of the handle.

The handle is movable in rotation relative to the base between a rest position in which it is positioned substantially parallel to the base, the arm being inserted into the housing, and an open position of the door in which it is inclined relative to the base, the arm being partially outside the housing. The arm comprises a hook at one of its ends.

The door handle assembly comprises an actuation device housed in the base and which is intended to be linked to a mechanism for opening the door. The actuation device comprises a lever movable in rotation engaging the hook of the arm of the handle.

The opening of the handle causes the sliding of the hook of the arm of the handle and consequently the rotation of the lever of the actuation device toward the handle, actuating in turn a mechanism for opening the door.

Although motor vehicles are equipped with a centralized opening and closing device, a lock cylinder (or lock) is fastened on the door to enable the opening of the door in case of failure of the centralized opening and closing device or in case of emergency.

Some handles comprise a longitudinal cover fastened on the handle and positioned above the lock.

However, during the assembly of this type of handle on the door of a vehicle, this configuration does not allow inserting the lock on the door after the mounting of the door handle assembly on the door.

Indeed, the longitudinal cover of the handle is positioned opposite the insertion area of the lock.

The insertion of the lock is also not possible even if the handle remains in an open position.

Consequently, the cylinder of the lock must be inserted before the handle, which is binding for the assembly but also for a repair operation aiming at dismounting the lock. Indeed, the door handle assembly must be completely dismounted in order to remove the lock from the door.

U.S. Patent Publication No. 2014/0245568 describes mounting a handle on a door allowing to insert the lock after the mounting of the handle.

This mounting provides for an additional support which slides relative to the base of the door handle assembly to easily mount and dismount the arm of the handle from the base. This allows mounting the handle before the insertion of the lock or dismounting the handle from the base.

The advantage of this approach is that the lock cylinder may be fastened at the same time as the sliding arm of the handle by using one single element such as a screw.

However, this approach requires using a supplementary element such as the additional support.

In addition, it is difficult to adapt this concept to a door handle assembly comprising an actuation device having a lever movable about a horizontal axis of rotation.

SUMMARY

This section provides a general summary of the disclosure and is not a comprehensive disclosure of its full scope or all of its features.

The present disclosure provides a door handle assembly and a method for mounting/dismounting this door handle assembly on a door of a motor vehicle allowing to easily mount and dismount a door handle on a base of the door handle assembly.

The present disclosure concerns a door handle assembly intended to be mounted on a door of a motor vehicle. The door handle assembly comprises:

a base intended to be fastened on the door, a handle linked to the base via a hinge at a first end of the handle and via an arm slidably mounted in a housing of the base at a second end of the handle, the handle being movable in rotation relative to the base between a rest position in which it is positioned substantially parallel to the base, the arm being inserted into the housing, and an open position of the door in which it is inclined relative to the base, the arm being partially outside the housing, the arm comprising a hook at one of its ends, and an actuation device housed in the base, intended to be linked to a mechanism for opening the door and comprising a first lever engaging the hook, the first lever being movably mounted in the housing of the base between a retracted position when the handle is in the rest position and a deployed position when the handle is in the open position. The actuation of the handle causes the sliding of the hook of the arm of the handle along a sliding axis Y and the displacement of the first lever of the actuation device toward the outside of the base and the actuation of the door opening mechanism to open the door. The actuation device comprises a return spring exerting a return force on the first lever in order to bring it back toward its retracted position.

According to the present disclosure, the door handle assembly comprises a blocking device movably mounted on the base between an unlocked position in which it does not cooperate with the actuation device and a locked position, when the handle is in the open position. The displacement of the blocking device toward its locked position causes a displacement of the actuation device toward a mounting/dismounting position of the handle in which the first lever of the actuation device is shifted relative to the sliding axis Y of the arm of the handle. This causes the blocking of the actuation device so as to enable the arm of the handle to freely slide within the housing of the base for its mounting in the base or its dismounting from the base.

Alternatively, the actuation device is movable in rotation about an axis of rotation between the rest position and the open position of the door, and in translation in the housing of the base along the axial direction X between an aligned position in which the first lever of the actuation device is aligned with the sliding axis Y of the arm of the handle and a shifted position in which the first lever of the actuation device is shifted relative to the sliding axis Y.

The blocking device exerts a force against the actuation device along the axial direction X in order to block its axial movement in this direction and in order to block its rotation.

Alternatively, the blocking device comprises a rod movable in translation relative to the base between an unlocking position in which the rod is disconnected from the actuation device and a locking position in which the rod exerts a pressure against the actuation device in order to hold it shifted relative to the sliding axis Y.

Alternatively, the rod is movable in translation along the axial direction X and in rotation about an axis of rotation extending along the axial direction X.

Alternatively, the rod comprises at least one lug cooperating with two blocking devices formed on the base in order to block the translation of the rod in the locking or unlocking position.

Alternatively, the rod comprises a first thread cooperating with a second thread provided in an orifice of the base in order to screw or unscrew the rod.

The present disclosure also concerns a method for mounting and dismounting a door handle assembly, as previously defined, on a door of a motor vehicle.

According to the present disclosure, the method comprises:

a step of positioning the actuation device in the open position of the door in order to bring the first lever of the actuation device in the deployed position, a step of shifting the first lever of the actuation device relative to the sliding axis Y of the arm of the handle by a blocking device in order to bring it in a mounting/dismounting position of the handle enabling the arm of the handle to freely slide within the housing of the base, a step of blocking the actuation device in the mounting/dismounting position by the blocking device, the blocking device being movably mounted on the base between an unlocked position and a locked position in which it blocks the actuation device, and a step of inserting the arm of the handle into the housing of the base in order to enable the mounting of the handle on the base or the removal of the arm of the handle out of the housing of the base in order to dismount the handle from the base.

Alternatively, during the step of positioning the actuation device in the open position of the door, the first lever performs a rotational movement about an axis of rotation extending along an axial direction X. And during the step of shifting the first lever, the first lever performs a translational movement in the housing of the base along the axial direction X between an aligned position in which the first lever of the actuation device is aligned with the sliding axis Y of the arm of the handle and a shifted position in which the first lever of the actuation device is shifted relative to the sliding axis Y. The blocking device exerts a force against the actuation device along the axial direction X in order to block its axial movement in this direction and in order to block its rotation.

Alternatively, the blocking device comprises a rod forming a latch. During the step of shifting the first lever, the rod translates along the axial direction X relative to the base and toward the actuation device from an unlocking position in which the rod is disconnected from the actuation device toward a locking position in which the rod exerts a pressure against the actuation device in order to hold it shifted relative to the sliding axis Y.

Alternatively, during the step of inserting the arm of the handle into the housing of the base, a first surface of the hook of the arm pushes the first lever of the actuation device toward a direction opposite to the hook when the arm is inserted into the housing of the base until the first lever recovers its initial position. The first lever is then positioned facing a second upper surface of the hook.

Thus, the present disclosure provides a door handle assembly and a method for mounting/dismounting this door handle assembly on a door of a motor vehicle allowing to easily mount and dismount a door handle on a base of the door handle assembly.

Thus, it is possible to insert the lock on the door after the mounting of the door handle assembly on the door.

It is also possible to easily dismount the door handle assembly from the door in order to change the lock.

This door handle assembly allows using an actuation device having a lever movable about a horizontal axis of rotation.

The present disclosure reduces the number of components comprising the door handle assembly as compared with the prior art using an additional support. The final weight is thus reduced.

The features above can be used alone or in combination, bringing each a particular advantage.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

Other characteristics and advantages of the present disclosure will become apparent upon reading the following description, given only as an example, with reference to the appended figures, which illustrate:

Figure 1:
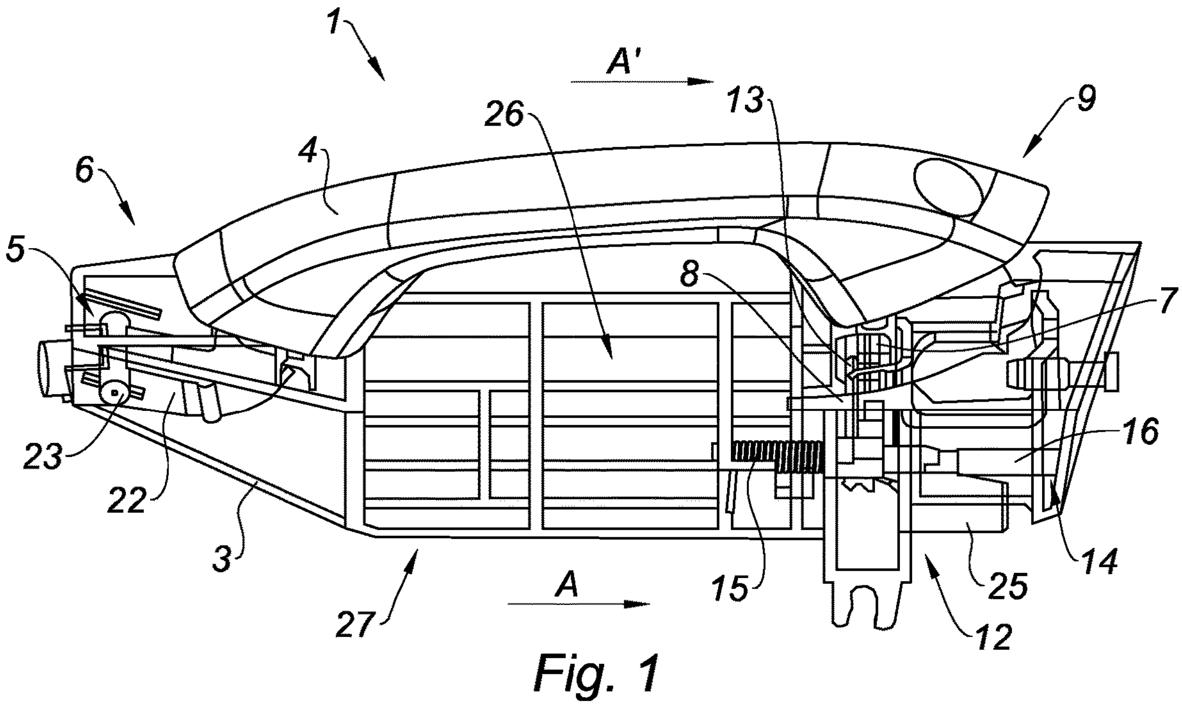
FIG. 1 is a schematic view of a door handle assembly when the handle is in the open position according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 illustrates a door handle assembly 1 which is mounted on a door 2 of a motor vehicle comprising a handle 4 represented in the open position.

The door handle assembly 1 comprises a base 3 intended to be fastened on the door 2.

The handle 4 is linked to the base 3 via a hinge 5 at a first end 6 of the handle 4 and via an arm 7 slidably mounted in a housing 8 of the base 3 at a second end 9 of the handle 4.

The hinge 5 comprises a pivot arm 22 which is in rotation about an axis of rotation 23. The pivot arm 22 has a first end linked to the base 3 via the axis of rotation 23 and a second end linked to the handle 4.

The handle 4 extends according to a longitudinal direction A'.

The base 3 extends according to a longitudinal direction A which is parallel to the door 2 when the door handle assembly 1 is mounted thereon.

When the handle 4 is in the rest position, the longitudinal direction A' of the handle 4 is substantially (approximately) parallel to the longitudinal direction A of the door 2.

The handle 4 is movable in rotation relative to the base 3 between a rest position in which it is positioned substantially parallel to the base 3, the arm 7 being inserted into the housing 8, and an open position of the door 2 in which it is inclined relative to the base 3, the arm 7 being partially outside the housing 8, as illustrated in FIG. 1.

The longitudinal direction A' of the handle 4 is then inclined relative to the longitudinal direction A of the door 2.

The handle 4 may be integral or comprise a handle body on which is fastened a cover or a gripping sleeve also having an aesthetic function.

The arm 7 comprises a hook 10 at one of its ends 11.

The door handle assembly 1 comprises an actuation device 12 housed in the base 3 and which is intended to be linked to a mechanism for opening the door 2 (not represented).

As illustrated in FIGS. 2 to 5, the actuation device 12 comprises a first lever 13 engaging the hook 10.

The first lever 13 is mounted movable in rotation about an axis of rotation 24 in the housing 8 of the base 3 between a retracted position when the handle 4 is in the rest position and a deployed position when the handle 4 is in the open position.

The actuation of the handle 4 causes the sliding of the hook 10 of the arm 7 of the handle 4 along a sliding axis Y and consequently the rotation of the first lever 13 of the actuation device 12 and toward the outside of the base 3 (direction opposite to the base 3).

This causes the actuation of the door 2 opening mechanism to open the door 2.

The sliding axis Y corresponds to the pathway followed by the arm 7 of the handle 4.

The actuation device 12 comprises a return spring 15 exerting a return force on the first lever 13 in order to bring it back toward its retracted position (initial position).

The base 3 comprises an outer face 26 and an opposite inner face 27.

The handle 4 is positioned on the side the outer face 26 of the base 3.

The actuation device 12 comprises a second lever 25 positioned on the side the inner face 27 of the base 3.

The second lever 25 is accessible to a user from the inside of the vehicle in order to open the door 2.

The door 2 comprises a lock (not represented) mounted on the door 2 and positioned below the handle 4.

According to the present disclosure, the door handle assembly 1 comprises a blocking device 14 movably mounted on the base 3 between an unlocked position in which it does not cooperate with the actuation device 12, as represented in FIGS. 5 to 9, and a locked position, when the handle 4 is in the open position, as represented in FIGS. 3, 4, 10 and 11.

The displacement of the blocking device 14 toward its locked position causes a displacement of the actuation device 12 toward a mounting/dismounting position of the handle 4 in which the first lever 13 of the actuation device 12 is shifted relative to the sliding axis Y of the arm 7 of the handle 4.

The actuation device 12 is blocked in this position, so as to enable the arm 7 of the handle 4 to freely slide within the housing 8 of the base 3 along the sliding axis Y for its mounting in the base 3 or its dismounting from the base 3.

The first lever 13 of the actuation device 12 then does no longer hinder the passage of the arm 7 of the handle 4 in the housing 8 of the base 3.

The handle 4 can be freely mounted on or dismounted from the base 3.

The actuation device 12 is movable in rotation about an axis of rotation 24 between the rest position and the open position of the door 2. The actuation device 12 may be assimilated to a cam with an axis of rotation 24 shifted relative to the sliding axis Y.

Figure 2:
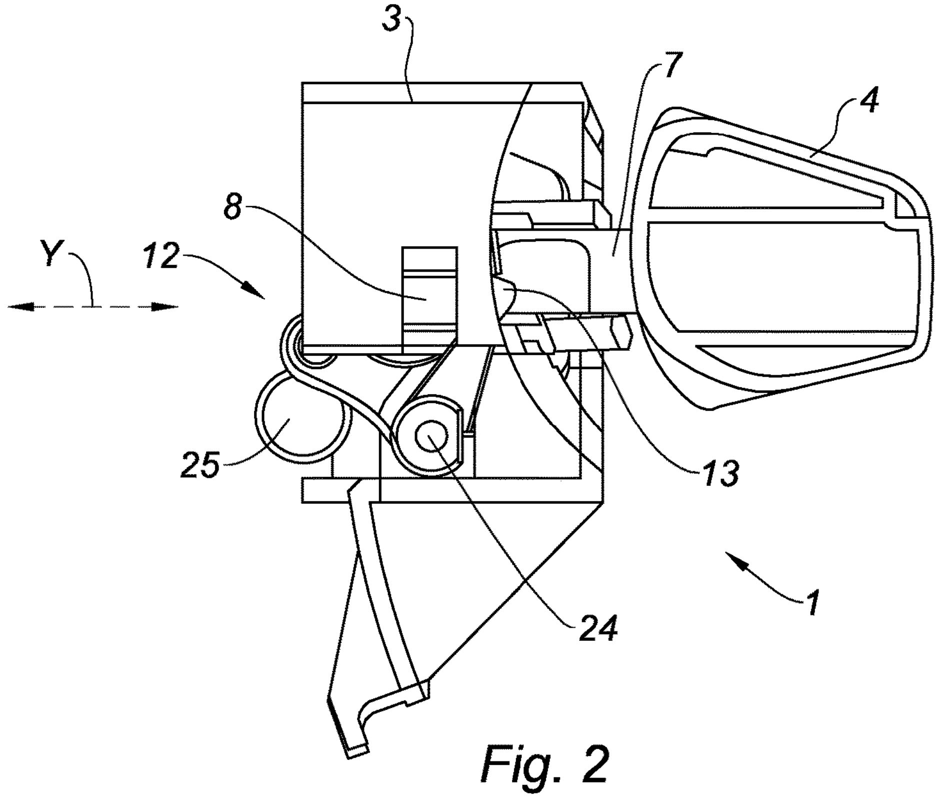
FIG. 2 is a detailed view of the actuation device cooperating with the handle of FIG. 1 when the handle is in the open position according to the teachings of the present disclosure.

Indeed, when a user pulls on the handle 4 toward the outside of the door 2, the arm 7 of the handle 4 slides within the housing 8 of the base 3 along the sliding axis Y toward the outside of the door 2 until being partially outside the housing 8, as illustrated in FIG. 2.

Since the first lever 13 of the actuation device 12 is engages the hook 10 of the arm 7 of the handle 4, the latter performs a rotational movement about the axis of rotation 24 toward the outside of the door 2 toward the outer face 26 of the base 3, thereby actuating an opening device to open the door 2.

The second lever 25 of the actuation device 12 performs the same rotational movement as the first lever 13 in order to be a little farther from the base 3.

The actuation device 12 is also movable in translation in the housing 8 of the base 3 along an axial direction X between an aligned position in which the first lever of the actuation device 12 is aligned with the sliding axis Y of the arm 7 of the handle 4 and a shifted position in which the first lever 13 of the actuation device 12 is shifted relative to the sliding axis Y.

More specifically, the actuation device 12 is movable in translation after its rotation from its retracted position toward its deployed position, when the handle 4 is brought toward its open position.

The blocking device 14 exerts a force against the actuation device 12 along the axial direction X and a direction opposite to that of the blocking device 14 in order to shift it relative to the sliding axis Y.

The housing 8 has a dimension adapted to enable the translational movability of the actuation device 12.

The blocking device 14 exerts a force against the actuation device 12 along the axial direction X in order to block its axial movement in this direction and also in order to block its rotation, since the return spring 15 tends to bring the first lever 13 back toward its retracted position.

The blocking device 14 comprises a rod 16 movable in translation relative to the base 3 between an unlocking position in which the rod 16 is disconnected from the actuation device 12, as illustrated in FIGS. 5 to 9, and a locking position in which the rod 16 exerts a pressure against the actuation device 12 in order to hold it shifted relative to the sliding axis Y, as represented in FIGS. 3, 4, 10 and 11. The return spring 15 creates a tension along the axis Y when the rod 16 is pushing the first lever 13.

The rod 16 is movably mounted on the base 3.

The rod 16 has a latch function and exerts a force opposing that of the return spring 15.

The rod 16 extends longitudinally along the axial direction X which is substantially perpendicular to the sliding axis Y in this example. The axial direction X may be not perpendicular to the sliding axis Y.

The rod 16 is movable in translation along the axial direction X and in rotation about an axis of rotation 19 extending along the axial direction X.

The rod 16 is housed and held in two orifices 28 provided in the base 3.

The rod 16 comprises a lug 30 cooperating with two blocking devices 31*a*, 31*b* formed on the base 3 to block the translation of the rod 16 in the locking and unlocking position. The lug 30 protrudes radially on the surface of the rod 16.

Figure 10:
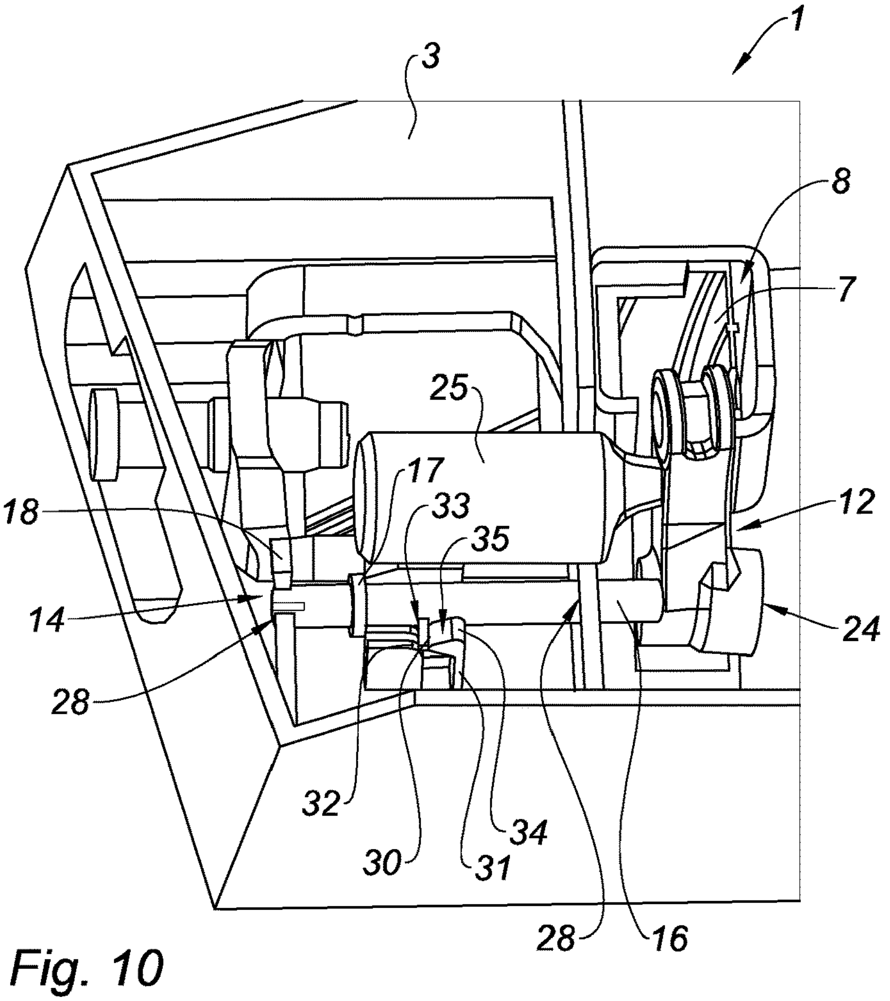
FIG. 10 is a schematic bottom view of the door handle assembly of FIG. 1 when the handle is open and the blocking device is in the locked position.
Figure 11:
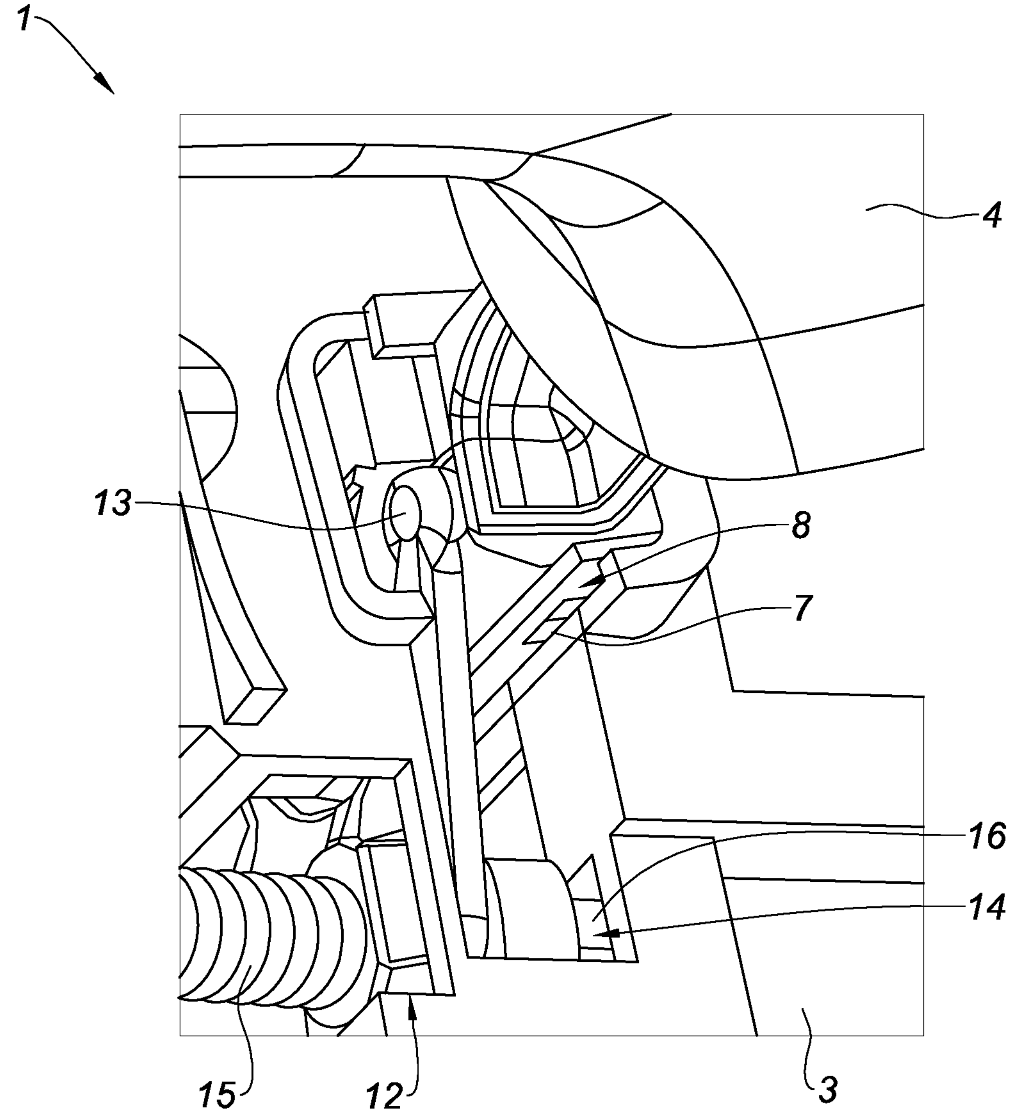
FIG. 11 is a detailed schematic view of FIG. 10.

A first blocking device 31*a* allows blocking the lug 30 in the locking position (FIG. 10).

Figure 8:
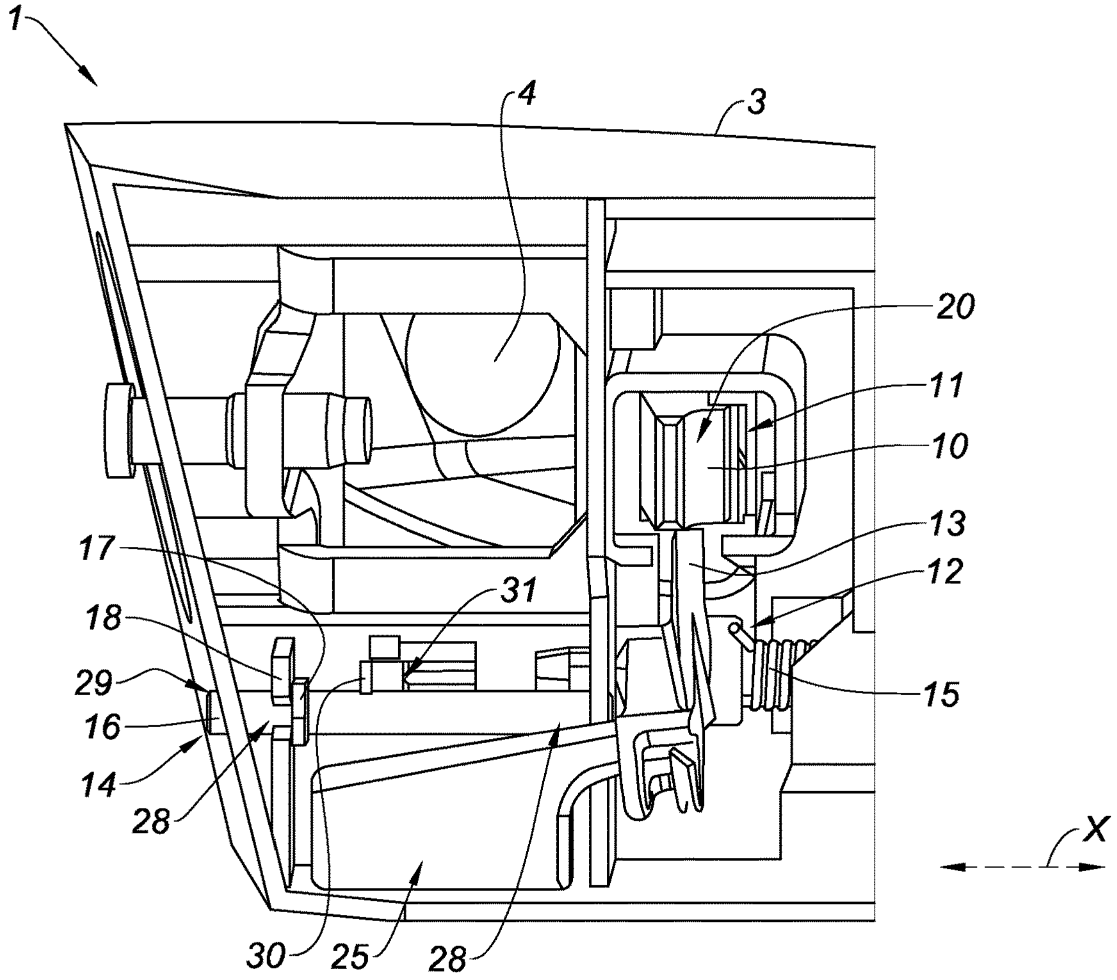
FIG. 8 is a schematic bottom view of the door handle assembly of FIG. 1 when the handle is at rest.
Figure 9:
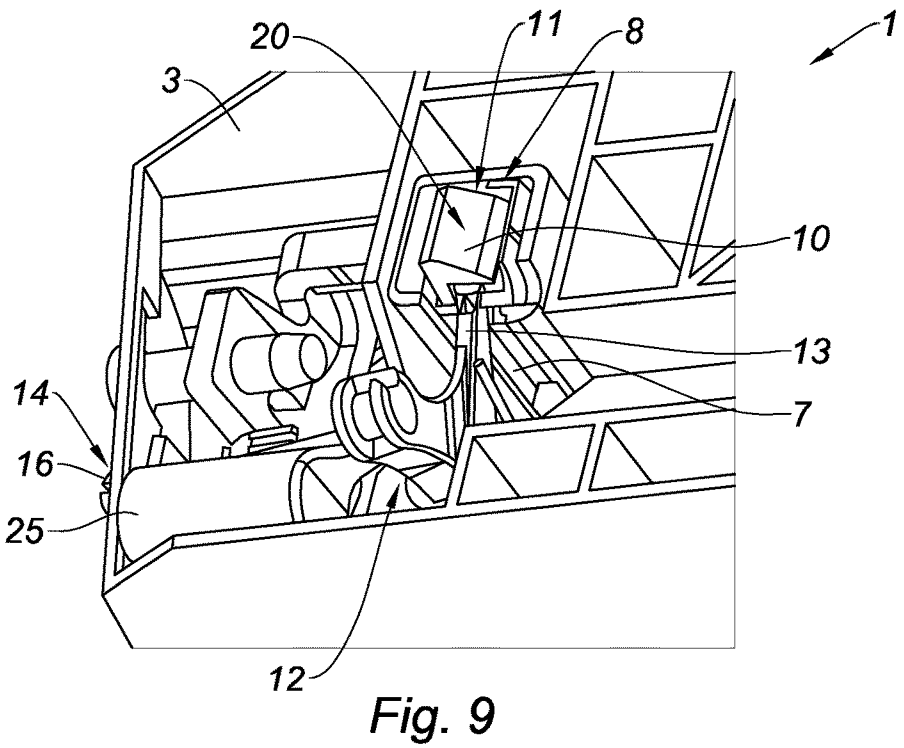
FIG. 9 is a detailed schematic view of FIG. 8.

A second blocking device 31*b* allows blocking the lug 30 in the unlocking position (FIG. 8).

The blocking devices 31*a*, 31*b* comprise, in one form, two fastening elements 32, 34, also known as fasteners, disposed on either side of a slot 33, as represented in FIG. 10. The blocking devices 31*a*, 31*b* are distant from each other.

The lug 30 is introduced or clipped into the slot 33 so as to be blocked.

One of the fastening elements 34 has a surface 35 inclined toward the slot 33 in order to facilitate the insertion or the clipping of the lug 30.

The rod 16 comprises a first thread (not represented) cooperating with a second thread (not represented) provided in a threaded orifice 29 of the base 3 in order to screw or unscrew the rod 16.

The rod 16 slides in translation and in rotation through these orifices 28, 29.

The rod 16 comprises an end lug 17 cooperating with a stop 18 formed on the base 3 in order to block the travel of the rod 16 when it is displaced toward its unlocking position.

The end lug 17 protrudes on and around the outer surface of the rod 16.

When the rod 16 is completely unscrewed to its unlocking position, as represented in FIG. 8, the end lug 17 of the rod 16 abuts against the stop 18 of the base 3 in order to stop the travel of the rod 16.

In this example, the stop 18 of the base 3 is formed by the walls delimiting an orifice 28 receiving the rod 16.

Conversely, when the rod 16 is completely screwed to the locking position, as represented in FIG. 10, the lug 30 of the rod 16 is inserted or clipped into the slot 33 of the first blocking device 31*a* in order to block the rod 16 in this position.

The present disclosure also concerns a method for mounting and dismounting a door handle assembly 1, as previously described, on a door 2 of a motor vehicle.

Figure 7:
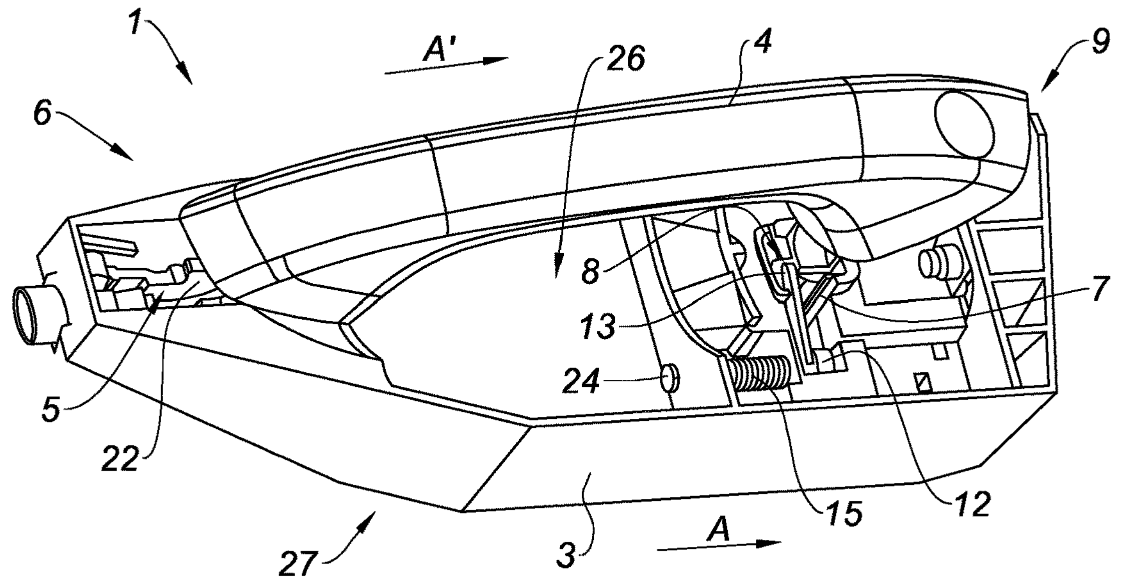
FIG. 7 is a schematic top view of the door handle assembly of FIG. 1 when the handle is open.

This method comprises a step of positioning the actuation device 12 in the open position of the door 2 in order to bring the first lever 13 of the actuation device 12 in the deployed position, as represented in FIGS. 1, 2 and 7.

This step is achieved by the actuation of the handle 4 for example by a user who pulls thereon.

Alternatively, this step may be achieved by a user who pulls on the second lever 25 of the actuation device 12.

Conversely, FIGS. 5, 6, 8 and 9 show the actuation device 12 in the closed position of the door or rest position. The first lever 13 of the actuation device 12 is engaging the hook 10 of the arm 7 of the handle 4. The first lever 13 is also in the retracted position (low position according to the planes of FIG. 5).

During the step of positioning the actuation device 12 in the open position of the door 2, the first lever 13 performs a rotational movement about an axis of rotation 24 extending along the axial direction X.

Afterwards, the method comprises a step of shifting the first lever 13 of the actuation device 12 relative to the sliding axis Y of the arm 7 of the handle 4 by the previously described blocking device 14, in order to bring it in a mounting/dismounting position of the handle 4 enabling the arm 7 of the handle 4 to freely slide within the housing 8 of the base 3.

This shift is achieved by a user pushing the second lever 25 of the blocking device 14 in the direction B, for example.

During the step of shifting the first lever 13, the latter performs a translational movement in the housing 8 of the base 3 along the axial direction X between an aligned position in which the first lever 13 of the actuation device 12 is aligned with the sliding axis Y of the arm 7 of the handle 4 and a shifted position in which the first lever 13 of the actuation device 12 is shifted relative to the sliding axis Y.

The mounting and dismounting method then comprises a step of blocking the actuation device 12 in the mounting/dismounting position by the blocking device 14.

The blocking device 14 exerts a force against the actuation device 12 along the axial direction X in order to block its axial movement in this direction and in order to block its rotation.

The lug 30 is then clipped into the slot 33 of the first blocking device 31*a* in order to block the translation and the rotation of the rod 16.

Figure 3:
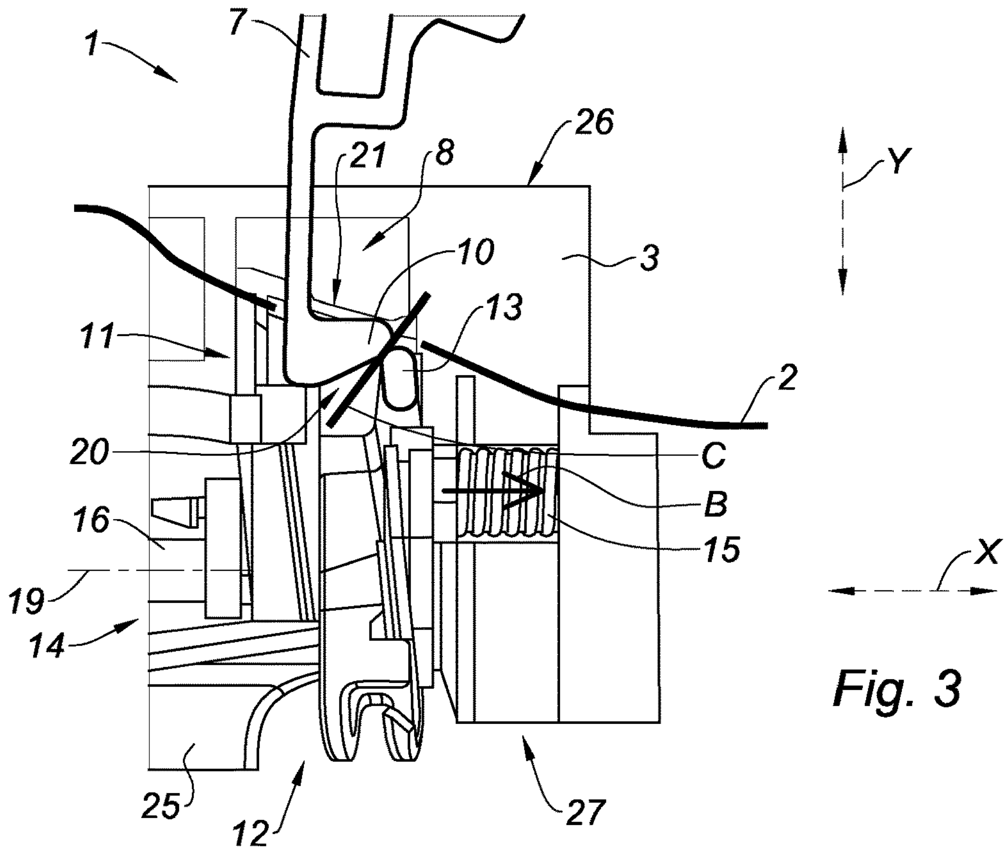
FIG. 3 is another detailed view showing the actuation device blocked in a position shifted relative to the axis of translation Y according to the teachings of the present disclosure.

Alternatively, the screwing of the rod 16 of the blocking device 14 toward the locking position may allow pushing the actuation device 12 and shifting it to the right when referring to the plane of FIG. 3, that is to say in the direction of the arrow B, according to the sliding axis Y.

During the step of shifting the first lever 13, the rod 16 translates along the axial direction X relative to the base 3 and toward the actuation device 12 from an unlocking position in which the rod 16 is disconnected from the actuation device 12 toward a locking position in which the rod 16 exerts a pressure against the actuation device 12 in order to hold it shifted relative to the sliding axis Y.

The rod 16 of the blocking device 14 blocks both the translation of the actuation device 12 thereby inhibiting its return toward its initial position and the rotation of the actuation device 12. Hence, the rod 16 counteracts the return force exerted by the return spring 15 in the direction opposite to the direction B and the torque also generated by this return spring 15 on the first lever 13.

The blocking device 14 therefore allows providing a pre-assembled door handle assembly 1, that is to say not comprising yet the handle 4 which may be assembled later on, after the insertion of the lock onto the door 2.

The mounting and dismounting method then comprises a step of inserting the arm 7 of the handle 4 into the housing 8 of the base 3 in order to enable the mounting of the handle 4 on the base 3 or the removal of the arm 7 of the handle 4 out of the housing 8 of the base 3 in order to dismount the handle 4 from the base 3.

In particular, the mounting method comprises an initial step of fastening the base 3 on the door 2 of the vehicle.

The hinge 5 at the first end 6 of the handle 4 is then mounted on the base 3.

The mounting method also comprises the previous steps of positioning the actuation device 12 in the open position of the door 2, of shifting the first lever 13 of the actuation device 12 relative to the sliding axis Y of the arm 7 of the handle 4 by the blocking device 14 and of blocking the actuation device 12 in the mounting/dismounting position by the blocking device 14.

The mounting method then comprises a step of inserting the arm 7 of the handle 4 into the housing 8 of the base 3 during which a first surface 20 of the hook 10 of the arm 7 pushes the first lever 13 of the actuation device 12 toward a direction opposite to the hook 10 when the arm 7 is inserted into the housing 8 of the base 3 until the first lever 13 recovers its initial position.

The first lever 13 is then positioned facing a second upper surface 21 of the hook 10.

More specifically, the first surface 20 of the hook 10 slides on the first lever 13 of the actuation device 12 according to a plane C, represented in FIG. 3, and exerts a force opposing the return force of the return spring 15, thereby causing a slight displacement of the first lever 13 toward this spring.

Figure 4:
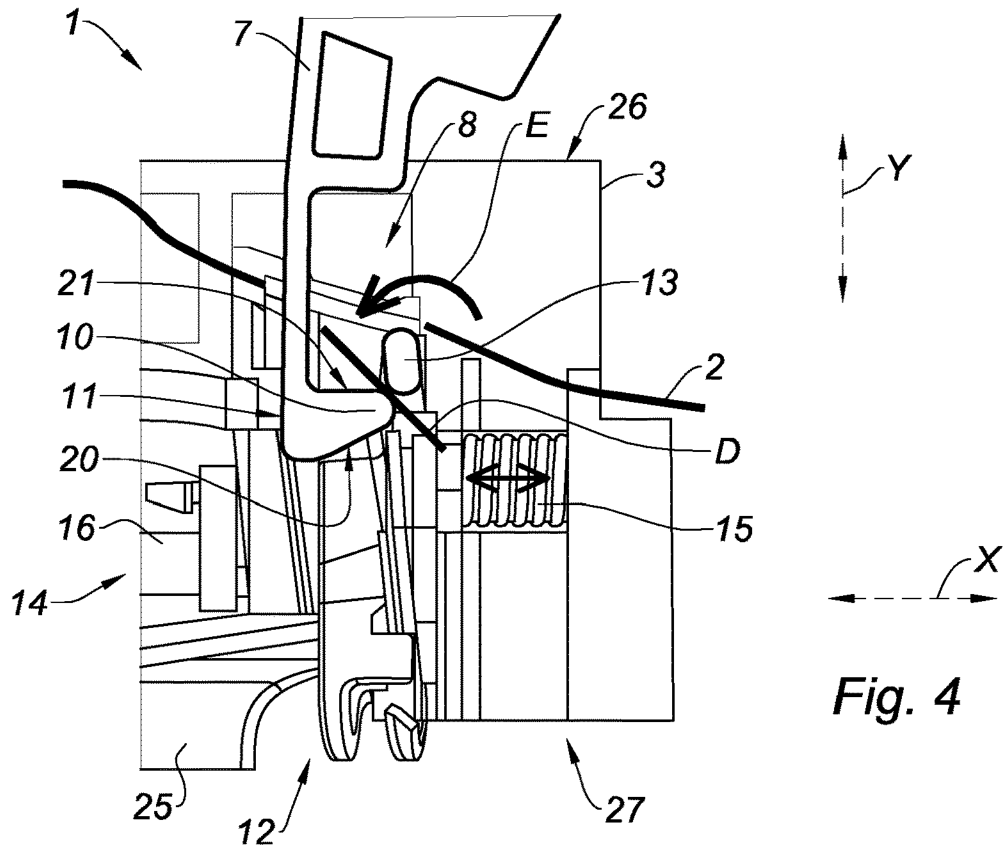
FIG. 4 is a view of the arm of the handle during its insertion into the housing of the base according to the teachings of the present disclosure.

After a supplementary insertion of the arm 7 into the housing 8, the first lever 13 then slides along the second upper surface 21 of the hook 10 according to a plane D, until recovering its initial position after a movement according to the arrow E, as illustrated in FIG. 4. The operator may hear a noise due to the return of the first lever 13 which is pushed by the return spring 15.

The first lever 13 is then engaging the hook 10 of the handle 4.

Figure 5:
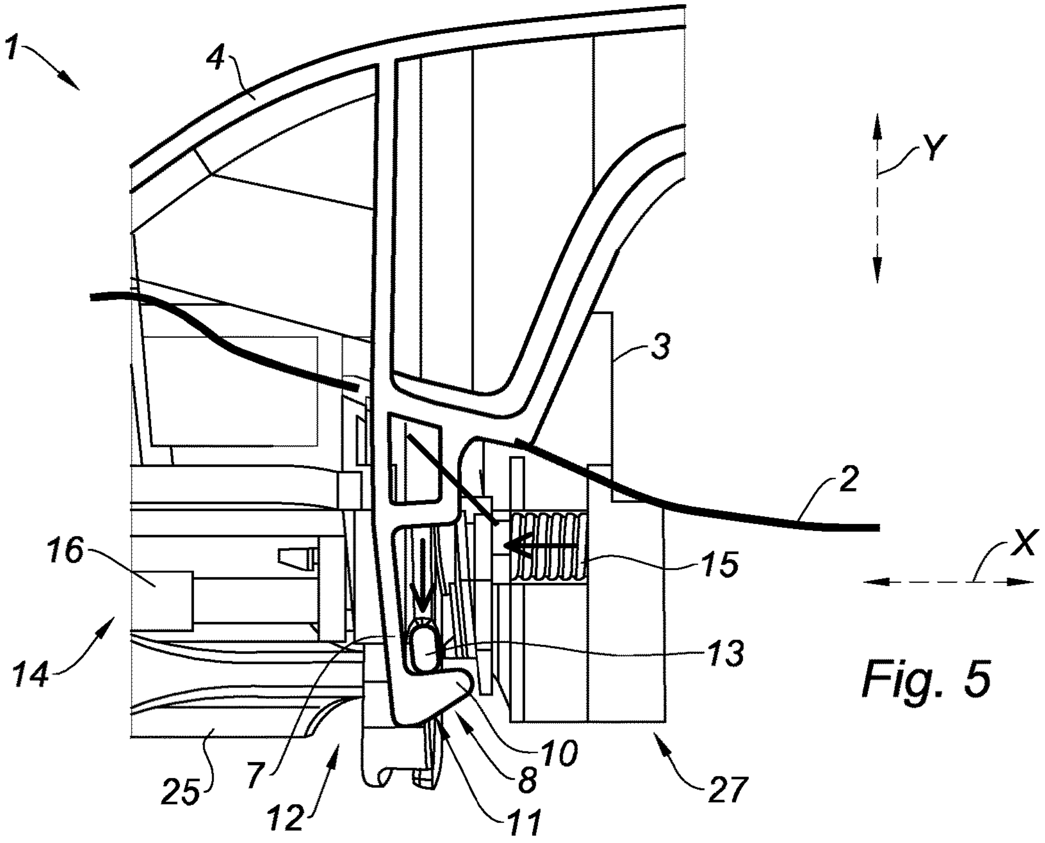
FIG. 5 is a schematic view of the first lever of the actuation device engaging the hook of the arm of the handle when the handle is in the rest position according to the teachings of the present disclosure.
Figure 6:
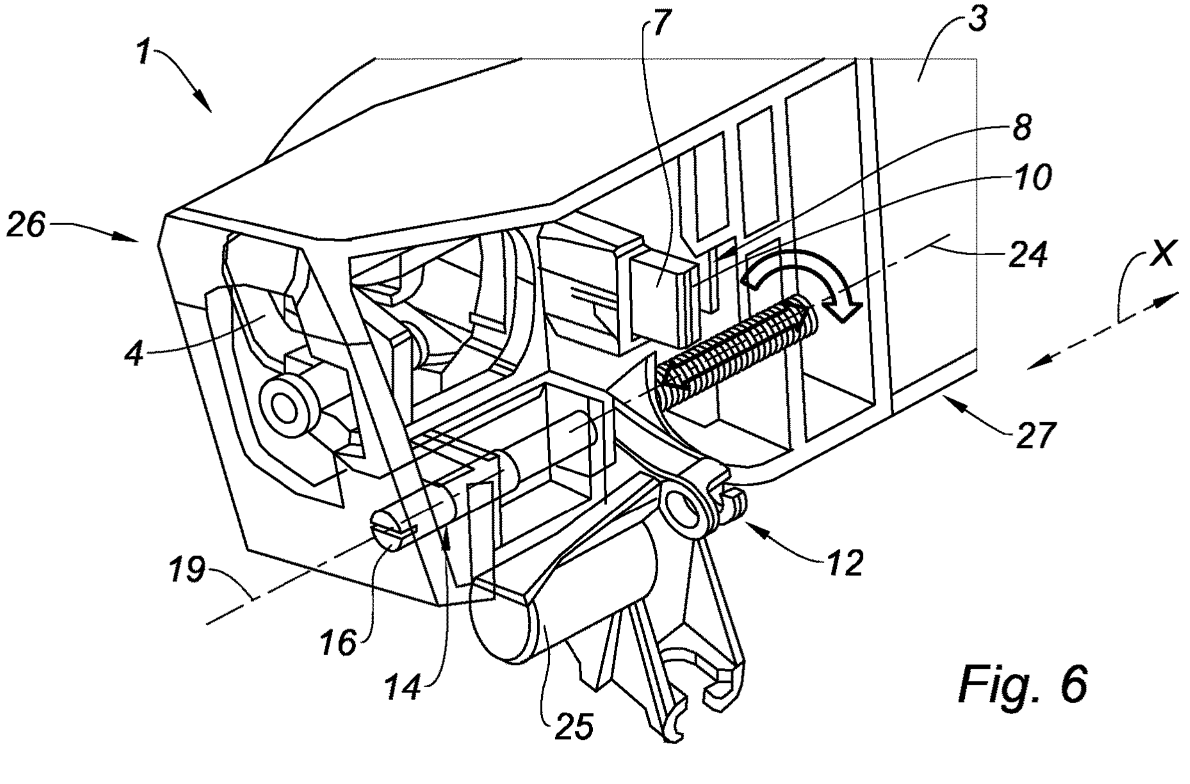
FIG. 6 is a schematic bottom view of the door handle assembly of FIG. 1.

The blocking device 14 is then displaced in the unlocked position and the first lever 13 recovers its retracted or rest position, as illustrated in FIG. 5.

The lug 30 of the rod 16 is clipped into the slot of the second blocking device 31*b* in order to block the rod 16 in the unlocking position.

The handle 4 is thus mounted on the base 3.

According to the reverse method for dismounting the handle 4, when the blocking device 14 has blocked the first lever 13 in the dismounting position, the user pulls on the handle 4 according to a direction opposite to the base 3, thereby causing the sliding of the arm 7 of the handle 4 inside the housing 8 of the base 3 toward the outside until its extraction from the housing 8.

The hinge 5 at the first end 6 of the handle 4 is then dismounted in order to completely remove the handle 4 from the base 3.

A lock may afterwards be fastened on the door 2 of the vehicle.

The present disclosure is described in the foregoing as an example. It is understood that those skilled in the art are capable of carrying out different variations without departing from the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A door handle assembly configured to be mounted on a door of a motor vehicle, the door handle assembly comprising:

a base configured to be fastened on the door the base including a housing;

an arm slidably mounted in the housing and comprising a hook at one of its ends;

a hinge;

a handle, wherein a first end of the handle is coupled to the base via the hinge such that the handle is rotatable between a rest position and an open position, wherein a second end of the handle is coupled to the base via the arm, wherein when in the rest position, the handle is positioned approximately parallel to the base and the arm extends into the housing, wherein when in the open position, the handle is inclined relative to the base and the arm is partially outside the housing;

an actuation device housed in the base, configured to be linked to a mechanism for opening the door and comprising a first lever and a return spring, the first lever being movably mounted in the housing for movement relative to the housing between a retracted position and a deployed position, wherein the first lever engages the hook such that when the handle is in the rest position the first lever is in the retracted position, and when the handle is in the open position the first lever is in the deployed position, the rotation of the handle from the rest position to the open position causing the sliding of the hook along a sliding path to begin in a sliding direction to move the first lever to the deployed position such that the first lever is displaced toward the outside of the base and actuates the mechanism to open the door, wherein the return spring exerts a return force on the first lever to bring the first lever back toward its retracted position; and a blocking device movably mounted on the base for displacement relative to the base between an unlocked position in which the blocking device is disconnected from the actuation device and a locked position, wherein when the handle is in the open position and the blocking device is displaced toward its locked position, the blocking device displaces the actuation device toward a mounting/dismounting position of the handle in which the first lever of the actuation device is shifted in a direction transverse to the sliding direction to block the actuation device and permit the arm to freely slide within the housing of the base for its mounting in the base or its dismounting from the base.

2. The door handle assembly according to claim 1, wherein the actuation device is movable in rotation about an axis of rotation between the rest position and the open position of the door, and in translation in the housing of the base along an axial direction between an aligned position in which the first lever of the actuation device is aligned with the sliding path of the arm and a shifted position in which the first lever of the actuation device is shifted relative to the sliding path in the direction transverse to the sliding direction, the blocking device exerting a force against the actuation device along the axial direction to block its axial movement along the axial direction and to block its rotation.

3. The door handle assembly according to claim 1, wherein the blocking device comprises a rod movable in translation relative to the base between an unlocking position in which the rod is disconnected from the actuation device and a locking position in which the rod exerts a pressure against the actuation device to hold it shifted in the direction transverse to the sliding direction.

4. The door handle assembly according to claim 3, wherein the rod is movable in translation along an axial direction and in rotation about an axis of rotation extending along the axial direction.

5. The door handle assembly according to claim 3, wherein the rod comprises at least one lug cooperating with two blocking devices formed on the base to block the translation of the rod in the locking or unlocking position.

6. The door handle assembly according to claim 3, wherein the rod comprises a first thread cooperating with a second thread provided in an orifice of the base to screw or unscrew the rod.

7. A method for mounting and dismounting a door handle assembly on a door of a motor vehicle, the door handle assembly comprising:

- a base configured to be fastened on the door the base including a housing;
- an arm slidably mounted in the housing and comprising a hook at one of its ends:
- a hinge;
- a handle, wherein a first end of the handle is coupled to the base via the hinge such that the handle is rotatable between a rest position and an open position, wherein a second end of the handle is coupled to the base via the arm, wherein when in the rest position, the handle is positioned approximately parallel to the base and the arm extends into the housing, wherein when in the open position, the handle is inclined relative to the base and the arm is partially outside the housing; and
- an actuation device housed in the base, configured to be linked to a mechanism for opening the door and comprising a first lever and a return spring, the first lever being movably mounted in the housing for movement relative to the housing between a retracted position and a deployed position, wherein the first lever engages the hook such that when the handle is in the rest position the first lever is in the retracted position, and when the handle is in the open position the first lever is in the deployed position, the rotation of the handle from the rest position to the open position causing the sliding of the hook along a sliding path to begin in a sliding direction to move the first lever to the deployed position such that the first lever is displaced toward the outside of the base and actuates the mechanism to open the door, wherein the return spring exerts a return force on the first lever to bring the handle back toward its retracted position, wherein the method comprises:

- moving the handle from the rest position to the open position to bring the first lever of the actuation device to the deployed position;
- shifting the first lever of the actuation device in a direction transverse to the sliding direction by moving a blocking device until the first lever is in a mounting/dismounting position of the handle enabling the arm to freely slide within the housing of the base;
- blocking the actuation device in the mounting/dismounting position by the blocking device, the blocking device being movably mounted on the base between an unlocked position in which the blocking device is disconnected from the actuation device and a locked position in which the blocking device blocks the actuation device from returning from the mounting/dismounting position; and
- inserting the arm into the housing of the base to enable mounting of the handle on the base and removal of the arm out of the housing of the base to dismount the handle from the base.

8. The method according to claim 7, wherein when moving the handle from the rest position to the open position, the first lever rotates about an axis of rotation extending along an axial direction, and wherein when shifting the first lever, the first lever translates in the housing of the base along the axial direction between an aligned position and a shifted position, wherein when in the aligned position the first lever of the actuation device is aligned with the sliding path of the arm, wherein when in the shifted position the first lever of the actuation device is shifted relative to the sliding path in the direction transverse to the sliding direction, the blocking device exerting a force against the actuation device along the axial direction to block its axial movement along the axial direction and to block its rotation.

9. The method according to claim 7, wherein the blocking device comprises a rod operable as a latch such that, when shifting the first lever, the rod translates along an axial direction relative to the base and toward the actuation device from an unlocking position in which the rod is disconnected from the actuation device toward a locking position in which the rod exerts a pressure against the actuation device to hold the actuation device shifted relative to the sliding path.

10. The method according to claim 7, wherein when inserting the arm into the housing of the base, a first surface of the hook of the arm pushes the first lever of the actuation device toward a direction opposite to the hook when the arm is inserted into the housing of the base until the first lever recovers its initial position, the first lever being positioned facing a second upper surface of the hook.

* * * * *